US009536401B2

(12) United States Patent
Morgan, Jr.

(10) Patent No.: US 9,536,401 B2
(45) Date of Patent: *Jan. 3, 2017

(54) SYSTEMS AND METHODS FOR INDICATING THE PRESENCE OF A MOBILE DEVICE WITHIN A PASSENGER CABIN

(71) Applicant: Toyota Motor Engineering & Manufacturing North America, Inc., Erlanger, KY (US)

(72) Inventor: Christopher Carleton Morgan, Jr., Livonia, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 63 days.

This patent is subject to a terminal disclaimer.

(21) Appl. No.: 14/573,431

(22) Filed: Dec. 17, 2014

(65) Prior Publication Data

US 2015/0102937 A1 Apr. 16, 2015

Related U.S. Application Data

(63) Continuation of application No. 13/451,886, filed on Apr. 20, 2012, now Pat. No. 8,917,174.

(51) Int. Cl.
*G08B 1/08* (2006.01)
*G08B 3/10* (2006.01)
(Continued)

(52) U.S. Cl.
CPC ............... *G08B 3/10* (2013.01); *G01S 15/74* (2013.01); *G08B 21/22* (2013.01); *G08B 21/24* (2013.01);
(Continued)

(58) Field of Classification Search
CPC ............ G01S 15/74; G01S 5/26; G01S 11/14; G08B 21/22; G08B 21/24; G08B 3/10; H04W 4/008; H04W 4/023; H04W 4/046
See application file for complete search history.

(56) References Cited

U.S. PATENT DOCUMENTS 6,087,987 A 7/2000 Bachhuber et al.
6,331,817 B1 12/2001 Goldberg
(Continued)

OTHER PUBLICATIONS

Yang, Jie, et al.; Detecting Driver Phone Use Leveraging Car Speakers, ACM International Conference on Mobile Computing and Networking (MobiCom) 2011.
(Continued)

*Primary Examiner* — Firmin Backer
*Assistant Examiner* — Adnan Aziz
(74) *Attorney, Agent, or Firm* — Dinsmore & Shohl LLP

(57) ABSTRACT

Systems and methods for indicating the presence of a mobile device within a passenger cabin are provided. A method for indicating the presence of a mobile device within a passenger cabin of a vehicle includes linking a vehicle computing device with the mobile device, determining whether a vehicle ignition is off and whether a vehicle lock has been actuated. The method further includes generating an audible mobile device search signal that is played through a cabin and waiting to receive a response from the mobile device as to whether the mobile device detected the audible mobile device search signal. The method further includes determining whether the mobile device is within the passenger cabin based on whether a response was received from the mobile device and generating a first audible indication when the mobile device is within the passenger cabin.

20 Claims, 5 Drawing Sheets

(51) Int. Cl.
*G01S 15/74* (2006.01)
*H04W 4/04* (2009.01)
*G08B 21/22* (2006.01)
*G08B 21/24* (2006.01)
*G01S 5/26* (2006.01)
*G01S 11/14* (2006.01)

(52) U.S. Cl.
CPC ............... *H04W 4/046* (2013.01); *G01S 5/26* (2013.01); *G01S 11/14* (2013.01)

(56) References Cited

U.S. PATENT DOCUMENTS

| | | | |
|---|---|---|---|
| 6,462,660 B1 | 10/2002 | Cannon et al. | |
| 7,010,290 B2* | 3/2006 | Dent | G06Q 20/327 340/691.5 |
| 7,880,613 B1 | 2/2011 | Maeng | |
| 8,867,313 B1* | 10/2014 | Rivlin | G01S 11/14 367/118 |
| 2006/0136544 A1* | 6/2006 | Atsmon | G01S 5/22 709/200 |
| 2008/0090591 A1* | 4/2008 | Miller | G06Q 30/0255 455/456.3 |
| 2008/0304361 A1* | 12/2008 | Peng | G01S 15/74 367/127 |
| 2009/0207014 A1 | 8/2009 | Ayed | |
| 2010/0271202 A1 | 10/2010 | Lin | |
| 2011/0026364 A1* | 2/2011 | Lee | G01S 5/28 367/127 |
| 2011/0080300 A1 | 4/2011 | Bequette et al. | |
| 2011/0084807 A1 | 4/2011 | Logan et al. | |
| 2012/0108258 A1* | 5/2012 | Li | G01S 5/30 455/456.1 |
| 2013/0154819 A1 | 6/2013 | Stefanovski et al. | |
| 2013/0257604 A1 | 10/2013 | Mirle et al. | |
| 2013/0336094 A1 | 12/2013 | Gruteser et al. | |

OTHER PUBLICATIONS

Office Action mailed on Nov. 6, 2013 in U.S. Appl. No. 13/451,886.
Applicant's response filed on Feb. 5, 2014 to Office Action of Nov. 6, 2013 in U.S. Appl. No. 13/451,886.
Final Office Action mailed on Jun. 12, 2014 in U.S. Appl. No. 13/451,886.
Applicant's response filed on Aug. 8, 2014 to Final Office Action of Jun. 12, 2014 in U.S. Appl. No. 13/451,886.
Notice of Allowance mailed on Aug. 26, 2014 in U.S. Appl. No. 13/451,886.

* cited by examiner

SYSTEMS AND METHODS FOR INDICATING THE PRESENCE OF A MOBILE DEVICE WITHIN A PASSENGER CABIN

CROSS-REFERENCE TO RELATED APPLICATIONS

This application is a continuation of U.S. patent application Ser. No. 13/451,886, filed on Apr. 20, 2012.

TECHNICAL FIELD

Embodiments described herein generally relate to systems and methods for indicating the presence of a mobile device and, more specifically, to systems and methods for indicating the presence of a mobile device within a passenger cabin of a vehicle.

BACKGROUND

Oftentimes, vehicle users introduce mobile devices (e.g., mobile phones, smartphones, personal digital assistants, dedicated mobile media players, mobile personal computers, laptop computers, etc.) into the passenger cabin of the vehicle when entering the vehicle. Upon exiting the vehicle, vehicle users may leave the passenger cabin without their mobile devices. For example, the vehicle user may place the mobile device on the vehicle console, in the pocket of an article of clothing that is placed on a vehicle seat, etc. When a mobile device is inadvertently left in the passenger cabin, the vehicle user may be required to travel a great distance to retrieve it and/or may not remember where the mobile device was left. As a consequence, vehicle users may desire to receive an indication that a mobile device remains in the passenger cabin when the vehicle user exits the vehicle so that the mobile device may be retrieved, if desired.

Accordingly, a need exists for systems and methods for indicating the presence of a mobile device within a passenger cabin.

SUMMARY

In one embodiment, a method for indicating the presence of a mobile device within a passenger cabin of a vehicle includes linking a vehicle computing device with the mobile device. The method further includes the vehicle computing device determining whether a vehicle ignition is off and whether a vehicle lock has been actuated. The method further includes generating an audible mobile device search signal that is played through a cabin speaker when the vehicle ignition is off and the vehicle lock has been actuated. The method further includes waiting to receive a response from the mobile device as to whether the mobile device detected the audible mobile device search signal, after the audible mobile device search signal has been generated. The method further includes the vehicle computer device determining whether the mobile device is within the passenger cabin based on whether a response was received from the mobile device and generating a first audible indication when the mobile device is within the passenger cabin.

In another embodiment, a vehicle includes a system for indicating the presence of a mobile device within a passenger cabin of the vehicle. The system includes a vehicle computing device that includes a memory component that stores logic that, when executed by the vehicle computing device, causes the vehicle computing device to link the vehicle computing device with the mobile device, determine whether a vehicle ignition is off, and determine whether a vehicle lock has been actuated. The logic further causes the vehicle computing device to generate an audible mobile device search signal that is played through a cabin speaker when the vehicle ignition is off and the vehicle lock has been actuated. When executed by the vehicle computing device, the logic further causes the vehicle computing device to wait to receive a response from the mobile device as to whether the mobile device detected the audible mobile device search signal, after audible mobile device search signal has been played. The logic further causes the vehicle computing device to determine whether the mobile device is within the passenger cabin based on whether a response was received from the mobile device, and generate a first audible indication when the mobile device is within the passenger cabin.

In yet another embodiment, a system for indicating the presence of a mobile device within a passenger cabin of a vehicle includes a memory component that stores logic that, when executed by the system, causes the system to link a vehicle computing device with the mobile device, determine whether a vehicle ignition is off, and determine whether a vehicle lock has been actuated. The logic further causes the system to generate an audible mobile device search signal that is played through a cabin speaker when the vehicle ignition is off and the vehicle lock has been actuated. When executed by the system, the logic further causes the system to wait to receive a response from the mobile device as to whether the mobile device detected the audible mobile device search signal, after generating the audible mobile device search signal. The logic further causes the system to determine whether the mobile device is within the passenger cabin based on whether a response was received from the mobile device. When executed by the system, the logic further causes the system to generate a first audible indication that is played through an indicator speaker when the mobile device is within the passenger cabin, and generate a second audible indication that is played through the indicator speaker when the mobile device is not within the passenger cabin, wherein the second audible indication is different from the first audible indication.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for indicating the presence of a mobile device within a passenger cabin of a vehicle. Some embodiments may play an audible mobile device search signal through a cabin speaker after determining that the vehicle ignition is off and the vehicle lock has been actuated. Based on whether a response that the mobile device detected the search signal is received, embodiments may generate an audible indication that the mobile device is within the passenger cabin, thereby potentially alerting a vehicle user to retrieve the mobile device before leaving the vicinity of the vehicle. The various systems and methods for indicating the presence of a mobile device within a passenger cabin will be described in more detail herein with specific reference to the corresponding drawings.

Figure 1:
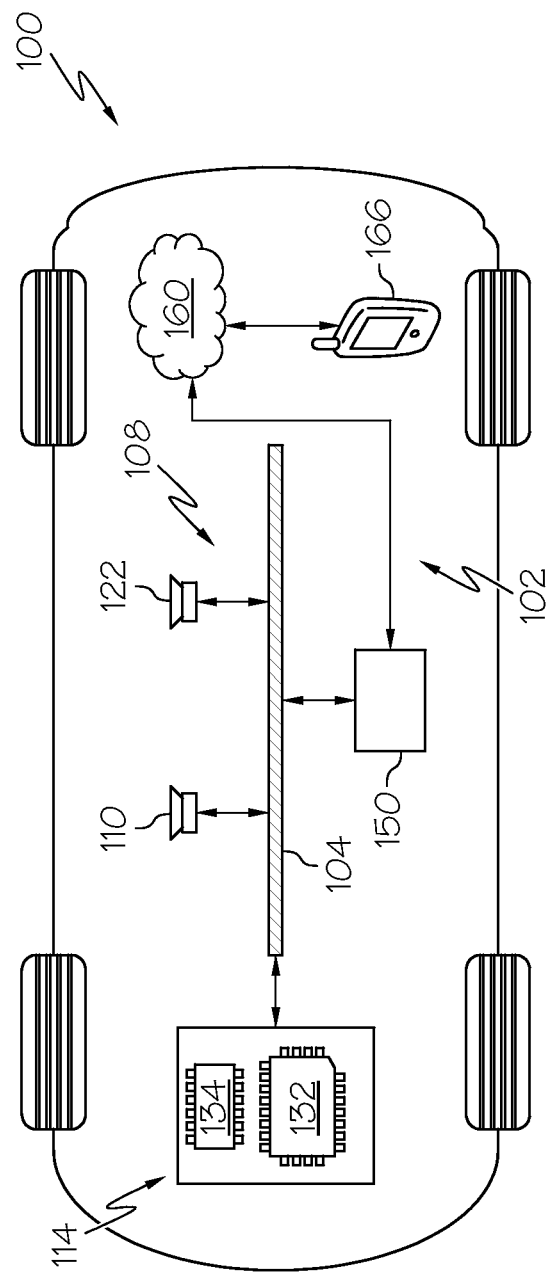
FIG. 1 schematically depicts a system for indicating the presence of a mobile device within a passenger cabin of a vehicle that includes a vehicle computing device, according to one or more embodiments shown and described herein.

Referring now to the drawings, FIG. 1 schematically depicts an embodiment of a vehicle 100 that includes a system 102 for indicating the presence of a mobile device 166 within a passenger cabin of the vehicle 100. The system 102 includes a vehicle computing device 114. It is noted that, while the vehicle 100 is depicted as an automobile, the vehicle 100 may be any passenger vehicle such as, for example, a terrestrial, aquatic, and/or airborne vehicle.

The system 102 may include a vehicle computing device 114 and/or other components. For example, the vehicle computing device 114 may include a communication path 104 that provides data interconnectivity between various vehicle modules disposed within the system 102. Specifically, each of the vehicle modules can operate as a node that may send and/or receive data. In some embodiments, the communication path 104 includes a conductive material that permits the transmission of electrical data signals to processors, memories, sensors, and actuators throughout the system 102. In another embodiment, the communication path 104 can be a bus, such as for example a LIN bus, a CAN bus, a VAN bus, and the like. In further embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The vehicle computing device 114 generally includes input/output hardware 108 communicatively coupled with the communication path 104. The input/output hardware 108 serves as an interconnection between a human driver and the vehicle 100. The input/output hardware 108 can include any device capable of transforming mechanical, optical, and/or electrical signals into a data signal capable of transmission via the communication path 104. Moreover, the input/output hardware 108 can include any device capable of transforming a data signal into a mechanical, optical, and/or electrical output. Each individual component of the input/output hardware 108 may include one or more processors and one or more memories. In some embodiments, each individual component of the input/output hardware 108 can omit a processor and/or a memory. Accordingly, it is noted that, while specific components are described herein as including a processor and/or a memory, the embodiments described herein should not be so limited.

The input/output hardware 108 depicted in FIG. 1 includes a cabin speaker 110 and an indicator speaker 122 for transforming data signals from the system 102 into mechanical vibrations. It should be noted that a signal may include a waveform (e.g., electrical, optical, magnetic, mechanical and/or electromagnetic), such as direct current (DC), alternating current (AC), sinusoidal-wave, triangular-wave, square-wave, vibration, and the like, capable of traveling through a medium. In one embodiment, the cabin speaker 110 is positioned within the passenger cabin of the vehicle 100 and the indicator speaker 122 is positioned outside of the passenger cabin of the vehicle 100. In other embodiments, the cabin speaker 110 may be positioned outside of the passenger cabin and/or the indicator speaker 122 may be positioned within the passenger cabin.

In some embodiments, the vehicle computing device 114 may include a processor 132 communicatively coupled with a memory component 134. The memory component 134 may be configured to store one or more pieces of logic, as described in more detail below. It is also noted that, while the vehicle computing device 114 includes a single processor 132 and a single memory component 134, this is merely one example. In other embodiments, the system 102 and/or vehicle computing device 114 may include a plurality of components each having one or more memories and/or processors that are communicatively coupled with one or more of the other components. Thus, the embodiments described herein may utilize a distributed computing arrangement to perform any portion of the logic described herein.

According to the embodiments described herein, the processor 132 may include any device capable of executing machine-readable instructions stored on a non-transitory computer-readable medium. Accordingly, each processor may include a controller, an integrated circuit, a microchip, a computer, and/or any other computing device. The memory described herein may include RAM, ROM, a flash memory, a hard drive, and/or any device capable of storing machine-readable instructions.

Embodiments of the present disclosure include logic that includes machine-readable instructions and/or an algorithm written in any programming language of any generation (e.g., 1GL, 2GL, 3GL, 4GL, and/or 5GL) such as, e.g., machine language that may be directly executed by the processor, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as preprogrammed hardware elements, and/or as a combination of hardware and software components.

The system 102 also includes a network 160 for communicatively coupling the vehicle computing device 114 with at least one mobile device 166. In one embodiment, the network 160 is a personal area network that utilizes Bluetooth technology to communicatively couple the vehicle computing device 114 and the at least one mobile device 166. In other embodiments, the network 160 may include one or more computer networks (e.g., a personal area network, a local area network, or a wide area network), cellular networks, satellite networks and/or a global positioning system and combinations thereof. Accordingly, the system 102 can be communicatively coupled to the network 160 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In some embodiments, the vehicle computing device 114 includes network interface hardware 150 for communicatively coupling the vehicle computing device 114 with the network 160. The network interface hardware 150 can be communicatively coupled to the communication path 104 and can be any device capable of transmitting and/or receiving data via the network 160. Accordingly, the network interface hardware 150 can include a communication transceiver for sending and/or receiving any wired or wireless communication. For example, the network interface hardware 150 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 150 includes hardware configured to operate in accordance with the Bluetooth wireless communication protocol. In another embodiment, network interface hardware 150 may include a Bluetooth send/receive module for sending and receiving Bluetooth communications to/from the at least one mobile device 166.

Still referring to FIG. 1, as stated above, the network 160 may be utilized to communicatively couple the vehicle computing device 114 with at least one mobile device 166. Each of the one or more mobile devices 166 can include one or more processors and one or more memories. The one or more processors can execute logic to communicate with the vehicle computing device 114 in order to facilitate the indication of the presence of a mobile device within the passenger cabin of the vehicle 100. The mobile device 166 may be configured with wired and/or wireless communication functionality for communicating with the vehicle computing device 114.

In embodiments described herein, the mobile device 166 may include a mobile phone, a smartphone, a personal digital assistant, a dedicated mobile media player, a mobile personal computer, a laptop computer, and/or any other mobile device 166 capable of being communicatively coupled with the vehicle computing device 114. As discussed in more detail below, the mobile device 166 may be capable of detecting an audible mobile device search signal emitted by the cabin speaker 110 and transmitting a message to the vehicle computing device 114 to signify whether the mobile device 166 detected the emitted mobile device search signal.

Figure 2:
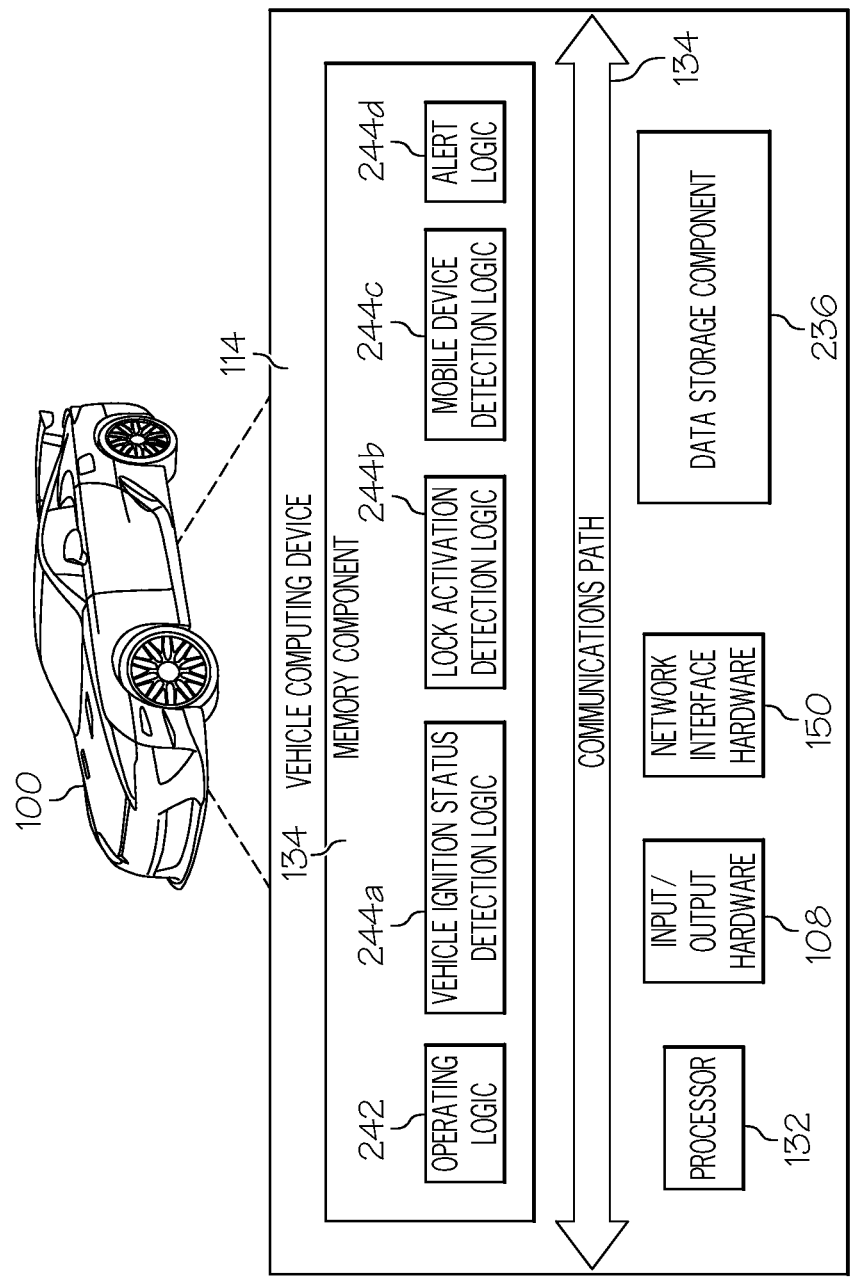
FIG. 2 schematically depicts the vehicle computing device from FIG. 1, further illustrating components of the vehicle computing device that may be utilized to indicate the presence of a mobile device within a passenger cabin, according to one or more embodiments shown and described herein.

FIG. 2 depicts another view of the vehicle computing device 114, according to one embodiment disclosed herein. As described with reference to FIG. 1, the vehicle computing device 114 includes the processor 132, the input/output hardware 108, the network interface hardware 150, a data storage component 236, and the memory component 134. The memory component 134 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 114 and/or external to the vehicle computing device 114.

The memory component 134 may store operating logic 242, vehicle ignition status detection logic 244*a*, lock activation detection logic 244*b*, mobile device detection logic 244*c*, and alert logic 244*d*. The vehicle ignition status detection logic 244*a*, the lock activation detection logic 244*b*, the mobile device detection logic 244*c*, and the alert logic 244*d* may each include a plurality of different pieces of logic, each of which may be embodied as a computer program, firmware, and/or hardware, as an example. The communication path may be implemented as a bus or other communication interface to facilitate communication among the components of the vehicle computing device 114.

As discussed above, the processor 132 may include any processing component operable to receive and execute instructions (such as from the data storage component 236 and/or the memory component 134). As described above, the input/output hardware 108 may include and/or be configured to interface with cabin speaker 110, indicator speaker 122, a door lock status sensor (e.g., a sensor operable to detect whether a door lock button in the interior cabin of the vehicle 100 has been pressed, a sensor operable to detect the rotation of the vehicle key in the vehicle key cylinder, a sensor operable to detect whether a mechanical door lock has been manipulated, or a sensor operable to detect whether a wireless door lock request signal has been received), a seatbelt sensor, a user sensor, a parking brake sensor, an emergency brake sensor, a passenger sensor and/or other device for receiving, sending, and/or presenting data as described herein. The network interface hardware 150 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the vehicle computing device 114 and other computing devices.

The operating logic 242 may include an operating system and/or other software for managing components of the vehicle computing device 114. The vehicle ignition status detection logic 244*a* may be configured to cause the processor 132 to detect the status of the vehicle ignition. Similarly, the lock activation detection logic 244*b* may be configured to cause the processor 132 to detect whether the vehicle locks have been actuated. The mobile device detection logic 244*c* may be configured to cause the processor to detect whether the mobile device is within the passenger cabin of the vehicle 100. The alert logic 244*d* may be configured to cause the processor 132 to generate an audible indication to alert a vehicle user of the presence of a mobile device within the passenger cabin.

It should be understood that while the components in FIG. 2 are illustrated as residing within the vehicle computing device 114, this is merely an example. In some embodiments, one or more of the components may reside external to the vehicle computing device 114. It should also be understood that, while the vehicle computing device 114 in FIG. 2 is illustrated as a single device, this is also merely an example. In some embodiments, the vehicle ignition status detection logic 244a, the lock activation detection logic 244b, the mobile device detection logic 244c, and the alert logic 244d may reside on different computing devices.

Additionally, while the vehicle computing device 114 is illustrated with the vehicle ignition status detection logic 244a, the lock activation detection logic 244b, the mobile device detection logic 244c, and the alert logic 244d as separate logical components, this is also an example. In some embodiments, a single piece of logic may cause the vehicle computing device 114 to provide the described functionality.

Figure 3:
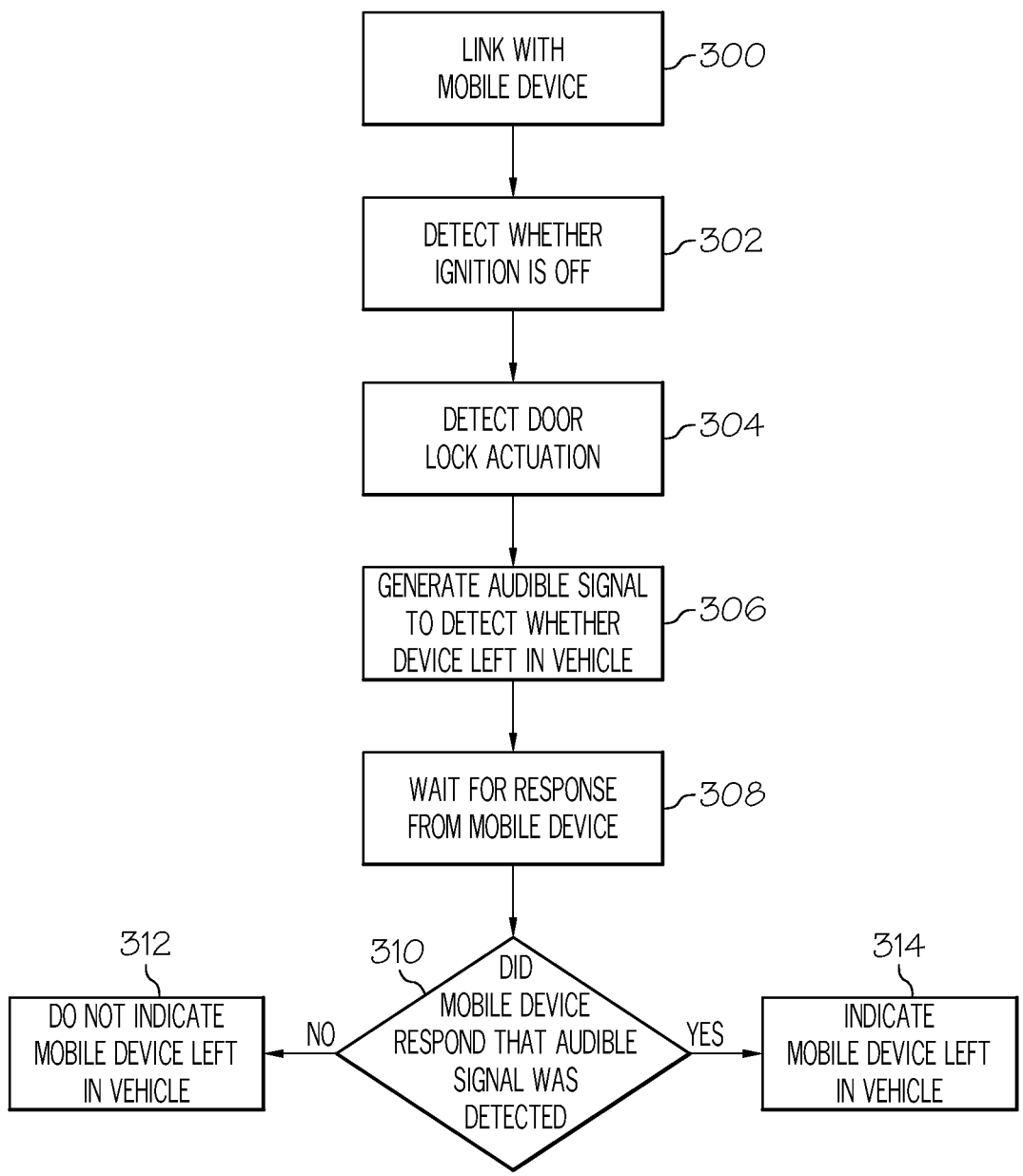
FIG. 3 depicts a flowchart for indicating the presence of a mobile device within a passenger cabin, according to one or more embodiments shown and described herein.

FIG. 3 depicts a flowchart for indicating the presence of a mobile device within a passenger cabin according to embodiments disclosed herein. Referring now to FIGS. 1-3, as illustrated in block 300, the vehicle computing device 114 links with the mobile device 166. In an embodiment in which the system 102 is equipped with Bluetooth functionality, the vehicle computing device 114 may link to the mobile device 166 via the Bluetooth pairing process. However, it should be understood that in other embodiments the vehicle computing device 114 may be linked to the mobile device 166 in any other manner that enables the vehicle computing device 114 and the mobile device 166 to communicate via network 160. While establishing the link between the vehicle computing device 114 and the mobile device 166 is depicted as the first step in the flowchart of FIG. 3, in other embodiments, the link may be established later.

In block 302, the vehicle computing device 114 determines whether the vehicle ignition is off. Specifically, the processor 132 of the vehicle computing device 114 may execute instructions from the vehicle ignition status detection logic 244a that cause the vehicle computing device 114 to determine whether the ignition is off. In one embodiment, the vehicle computing device 114 may determine whether the vehicle ignition is off by detecting the position of an ignition key switch of the vehicle 100. In other embodiments, the vehicle computing device 114 may determine whether the vehicle ignition is off by monitoring one or more signals or flags transmitted on the communication path 104 and/or the presence of power to any component operably coupled to vehicle computing device 114. However, it should be understood that in other embodiments the vehicle computing device 114 may determine whether the vehicle ignition is off in other ways including, without limitation, by detecting the presence of a key in the ignition, or the like.

In block 304, the vehicle computing device 114 determines whether a vehicle lock has been actuated. Specifically, the processor 132 of the vehicle computing device 114 may execute instructions from the lock activation detection logic 244b that cause the vehicle computing device 114 to determine whether the vehicle lock has been actuated. In one embodiment, the vehicle computing device 114 may determine whether the vehicle lock has been actuated by detecting the rotation of the vehicle key in the vehicle key cylinder to the locked position. In another embodiment, the vehicle computing device 114 may determine whether the vehicle lock has been actuated by receiving a wireless door lock request signal (typically transmitted by a wireless key fob) via a wireless receiver of network interface hardware 150 that is operably coupled to the vehicle computing device 114. In one embodiment, the vehicle computing device 114 may determine whether the vehicle lock has been actuated by detecting whether a door lock button in the interior cabin of the vehicle 100 has been pressed. In still another embodiment, the vehicle computing device 114 may determine whether the vehicle lock has been actuated by detecting whether a mechanical door lock in the passenger cabin has been manipulated. However, it should be understood that in other embodiments the vehicle computing device 114 may determine whether the vehicle lock has been actuated in other ways including, without limitation, monitoring one or more signals or flags transmitted on the communication path 104.

In block 306, after detecting that the vehicle ignition is off and the vehicle lock has been actuated, the vehicle computing device 114 generates an audible mobile device search signal that is played through cabin speaker 110 in the passenger cabin of the vehicle 100. In one embodiment, the audible mobile device search signal is played through a vehicle audio system that includes the cabin speaker 110. In another embodiment, the audible mobile device search signal may be played through a speaker within the passenger cabin that is separate from the vehicle audio system. In one embodiment, the audible mobile device search signal may be a high frequency signal at the upper end of the range of frequencies perceptible by the human ear in order to be unobtrusive to the vehicle user. For example, the high frequency search signal may be a signal with a frequency in the range from about 15 kHz to about 20 kHz. In another embodiment, the signal may have a frequency in the range from about 18 kHz to about 20 kHz. While some embodiments generate a high frequency audible mobile device search signal, other embodiments may generate a medium or low frequency audible mobile device search signal.

In block 308, the vehicle computing device 114 waits to receive a response from the mobile device 166 indicative of whether the mobile device 166 detected the audible mobile device search signal. Specifically, the processor 132 of the vehicle computing device 114 may execute instructions from the mobile device detection logic 244c that cause the vehicle computing device 114 to wait for a response from the mobile device 166. In one embodiment, the vehicle computing device 114 may transmit a message to the mobile device 166 before generating the audible mobile device search signal, in order to alert the mobile device 166 to be ready for the signal. After receiving the ready message from the vehicle computing device 114, the processor of the mobile device 166 may execute computer-readable instructions that cause the mobile device 166 to detect the audible mobile device search signal. Upon detecting the audible mobile device search signal, the mobile device 166 may transmit a message to the vehicle computing device 114 indicating that the mobile device 166 detected the audible mobile device search signal. In one embodiment, upon waiting a predetermined time without detecting the audible mobile device search signal, the mobile device 166 may transmit a message to the vehicle computing device 114 indicating that the mobile device 166 did not detect the audible mobile device search signal. For example, if the mobile device 166 is within a vehicle user's pocket outside, but near to, the passenger cabin, the mobile device 166 may still be within the range of a near-field communications network (e.g., Bluetooth network). In this scenario, the mobile device 166 would be capable of receiving the ready message from the vehicle computing device 114, but would not likely detect the audible mobile device search signal generated within the passenger cabin.

In block 310, the vehicle computing device 114 determines whether the mobile device 166 is within the passenger cabin based on whether the mobile device 166 transmitted a message indicating that the mobile device 166 detected the audible mobile device search signal. Specifically, the processor 132 of the vehicle computing device 114 may execute instructions from the mobile device detection logic 244c that cause the vehicle computing device 114 to determine whether the mobile device 166 is within the passenger cabin. In one embodiment, the vehicle computing device 114 may determine that the mobile device 166 is not within the passenger cabin if no response message was received from the mobile device 166 within a predetermined time period.

If the vehicle computing device 114 determined that the mobile device 166 is within the passenger cabin in block 310, the vehicle computing device 114 indicates that the mobile device 166 is within the passenger cabin in block 314. Specifically, the processor 132 of the vehicle computing device 114 may execute instructions from the alert logic 244d that cause the vehicle computing device 114 to generate an audible alert that indicates that the mobile device 166 is within the passenger cabin. In one embodiment, the vehicle computing device 114 indicates that the mobile device is within the passenger cabin by generating a first audible indication. The first audible indication may be played through the indicator speaker 122. In one embodiment, the indicator speaker 122 may be positioned outside of the passenger cabin of the vehicle. For example, the indicator speaker 122 may be the speaker that traditionally generates a sound when the lock button on the key fob is pressed. In another embodiment, the vehicle computing device 114 may transmit a wireless message to a wireless remote computing device (e.g., a key fob) indicating that the mobile device 166 is within the passenger cabin. After receiving the message, the wireless remote computing device may generate a first audible indication (e.g., by playing a sound through a speaker) that indicates that the mobile device 166 is within the passenger cabin. In other embodiments, the indication may be an indication other than an audible indication (e.g., a visual indication).

If the vehicle computing device 114 determined that the mobile device 166 is not within the passenger cabin in block 310, the vehicle computing device 114 may indicate that the mobile device is not within the passenger cabin in block 312. Specifically, the processor 132 of the vehicle computing device 114 may execute instructions from the alert logic 244d that cause the vehicle computing device 114 to generate an alert that indicates that the mobile device 166 is not within the passenger cabin. In one embodiment, the vehicle computing device 114 indicates that the mobile device is not within the passenger cabin by generating a second audible indication. The second audible indication may be different from the first audible indication, in order to allow a vehicle user to determine whether a mobile device was left within the passenger cabin based on the played sound. For example, the first audible indication may be a sound of a particular frequency or pattern, while the second audible indication may be a sound of a different frequency or pattern. In one embodiment, the second audible indication may be played through the same speaker as the first audible indication. In other embodiments, the first indication and/or the second indication may be indications other than an audible indication (e.g., a visual indication).

The timing of establishing the communicative link between the mobile device 166 and the vehicle computing device 114 may be different in different embodiments. As noted above, while establishing the link between the vehicle computing device 114 and the mobile device 166 is depicted as the first step in the flowchart of FIG. 3, in other embodiments, the link may be established later. For example, in one embodiment, the link between the mobile device 166 and the vehicle computing device 114 may be established after detecting whether the ignition is off and after detecting whether the door locks were actuated. In another embodiment, a link between the mobile device 166 and the vehicle computing device 114 may have been established before the vehicle ignition is turned off. In such an embodiment, the link may be maintained after the vehicle ignition is turned off.

Figure 4:
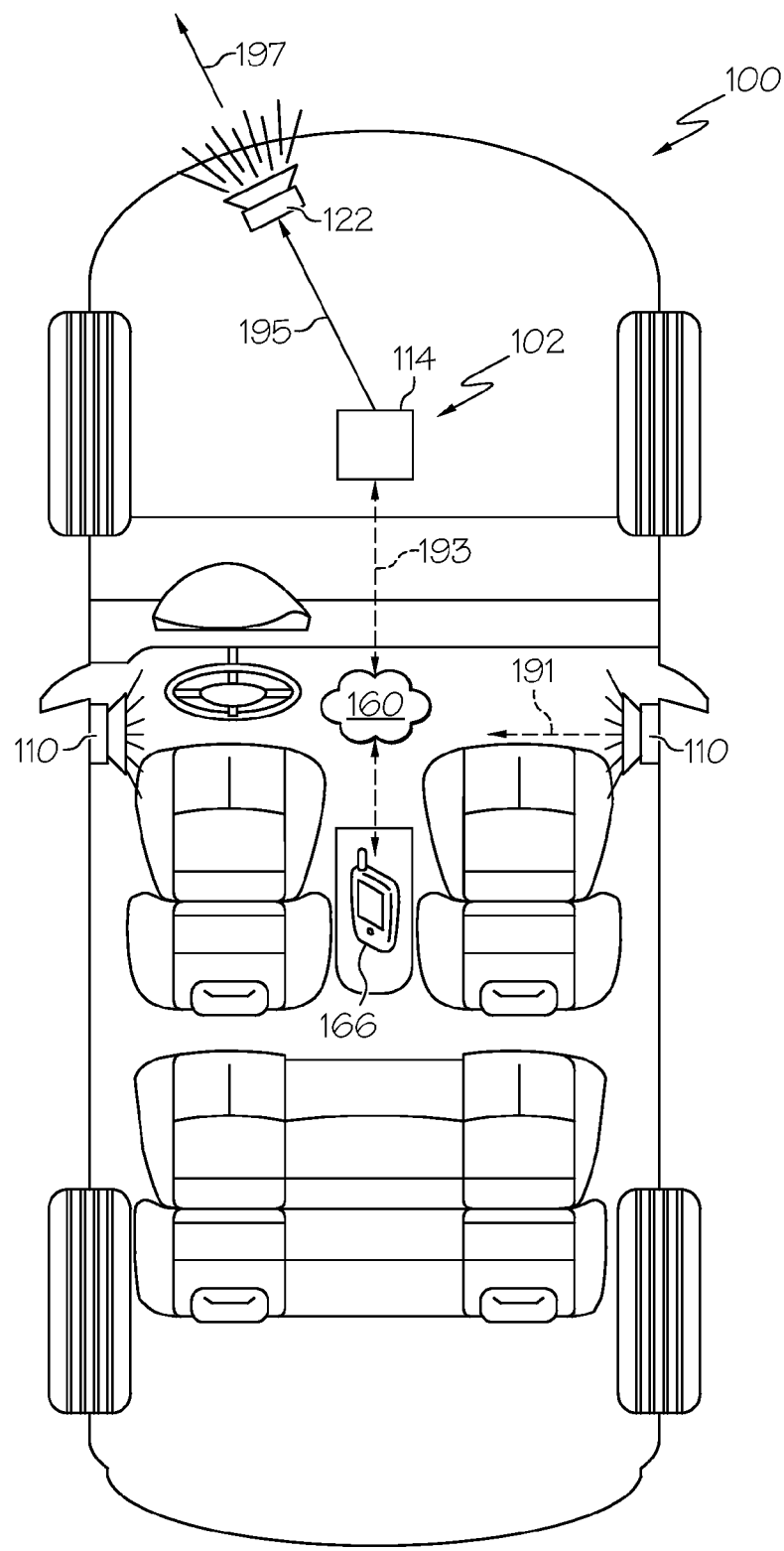
FIG. 4 schematically depicts the system of FIG. 1 functioning to indicate that a mobile device is present within the passenger cabin, according to one or more embodiments shown and described herein.

Referring now to FIG. 4, the system 102 of FIG. 1 functioning to indicate that a mobile device is present within the passenger cabin of the vehicle 100 is schematically depicted. As illustrated in FIG. 4, the mobile device 166 has been placed on the center console of the vehicle. The mobile device 166 is communicatively linked to vehicle computing device 114 via network 160. Assuming that the vehicle user has exited the vehicle and the vehicle has been locked, the vehicle computing device 114 detects that the vehicle ignition is off and that the vehicle lock has been actuated. An audible mobile device search signal 191 is generated and played through cabin speaker 110. Mobile device 166 detects the audible mobile device search signal 191 and sends a response 193 to the vehicle computing device 114 (via network 160) to indicate that the mobile device 166 detected the audible mobile device search signal 191. After determining that the mobile device 166 is within the passenger cabin based on the received response 193, the vehicle computing device 114 generates a signal 195 that is transmitted to indicator speaker 122, which in turn plays a first audible indication 197 that the mobile device is within the passenger cabin of the vehicle 100. Upon hearing the first audible indication 197, the vehicle user can retrieve the mobile device 166 from the passenger cabin before leaving the vicinity of the vehicle 100.

Figure 5:
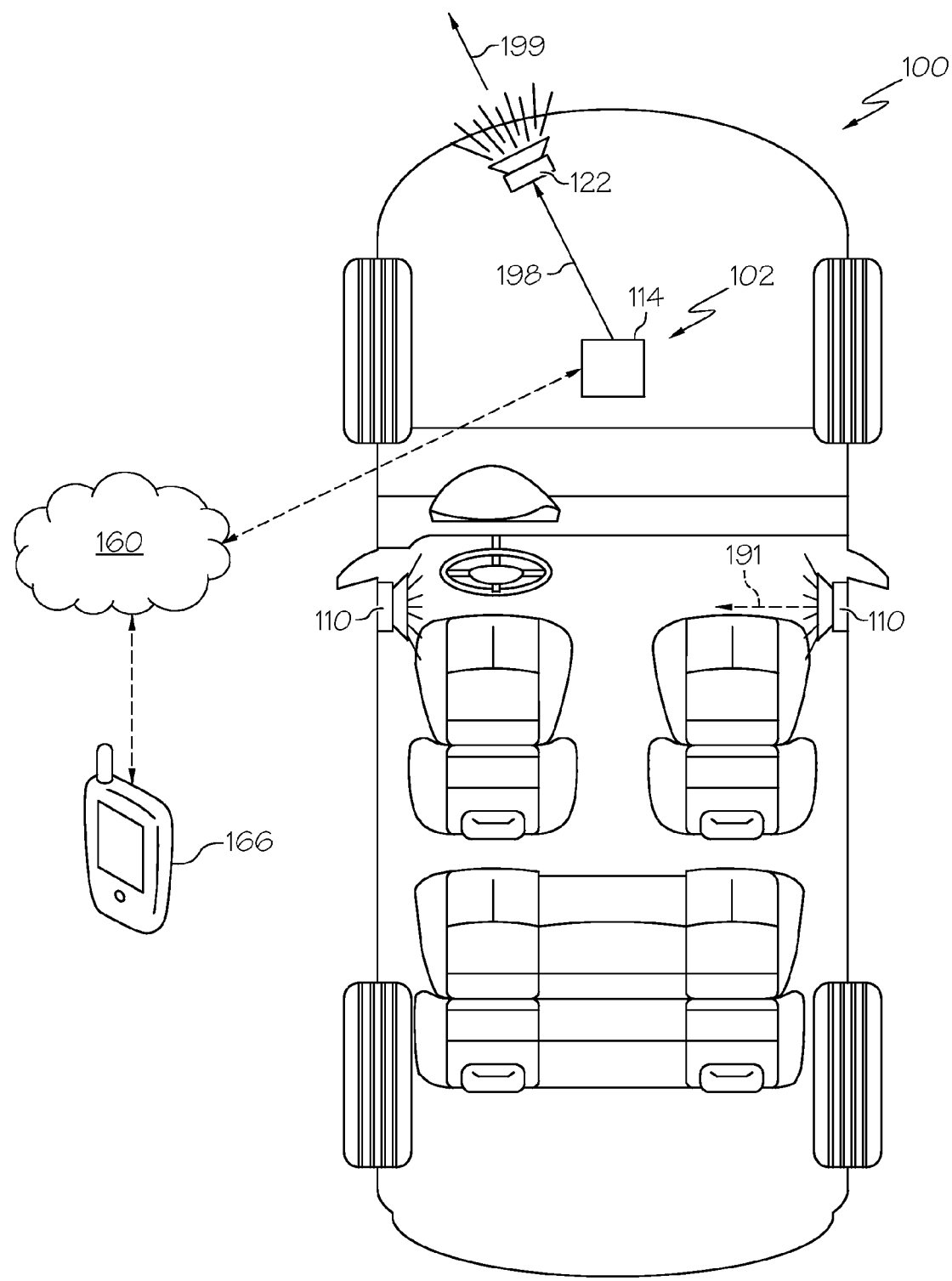
FIG. 5 schematically depicts the system of FIG. 1 functioning to indicate that a mobile device is not present within the passenger cabin, according one or more embodiments shown and described herein.

Referring now to FIG. 5, the system 102 of FIG. 1 functioning to indicate that a mobile device is not present within the passenger cabin of the vehicle 100 is schematically depicted. As illustrated in FIG. 5, the mobile device 166 is positioned outside of the passenger cabin (e.g., as a result of the vehicle user exiting the passenger cabin with the mobile device 166). Because mobile device 166 is still within range of network 160, mobile device 166 may still be communicatively linked to vehicle computing device 114 via network 160. Assuming that the vehicle user has exited the vehicle and the vehicle has been locked, the vehicle computing device 114 detects that the vehicle ignition is off and that the vehicle lock has been actuated. An audible mobile device search signal 191 is generated and played through cabin speaker 110. Mobile device 166 does not detect the audible mobile device search signal 191 because mobile device 166 is positioned outside of the passenger cabin. After determining that the mobile device 166 is not within the passenger cabin based on not receiving a response from the mobile device 166 that the mobile device 166 detected the audible mobile device search signal 191, the vehicle computing device 114 generates a signal 198 that is transmitted to indicator speaker 122, which in turn plays a second audible indication 199 that the mobile device is not within the passenger cabin of the vehicle 100. Upon hearing the second audible indication 199, the vehicle user is alerted that mobile device 166 was not left within the passenger cabin of the vehicle 100.

It should be understood that embodiments described herein provide for systems and methods for indicating the presence of a mobile device within a passenger cabin. The systems and methods described herein may indicate the presence of a mobile device inadvertently left in the passenger cabin to a vehicle user while the vehicle user is still in close proximity to the vehicle, thereby allowing the vehicle user to retrieve the mobile device and avoid the inconvenience of returning to the vehicle to retrieve the mobile device from a greater distance and/or the possibility of not remembering where the mobile device was left.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for indicating the presence of a mobile device within a passenger cabin of a vehicle comprising:
   determining whether a vehicle ignition is off;
   determining whether a vehicle lock has been actuated;
   generating an audible mobile device search signal that is played through a cabin speaker when the vehicle ignition is off and the vehicle lock has been actuated;
   receiving a response from the mobile device at a vehicle computing device, wherein the response is indicative that the mobile device detected the audible mobile device search signal; and
   generating a first audible indication that the mobile device is within the passenger cabin when the response from the mobile device is received.

2. The method of claim 1, further comprising generating a second audible indication different from the first audible indication when the mobile device is not within the passenger cabin of the vehicle.

3. The method of claim 1, wherein determining whether the vehicle ignition is off comprises detecting a position of a key switch.

4. The method of claim 1, wherein the audible mobile device search signal is generated through a vehicle audio system that includes the cabin speaker.

5. The method of claim 1, wherein the first audible indication is played through an indicator speaker.

6. The method of claim 1, wherein determining whether the vehicle lock has been actuated comprises receiving, by a wireless receiver communicatively coupled to the vehicle computing device, a door lock request signal.

7. The method of claim 1, wherein the vehicle is linked to the mobile device via a wireless connection.

8. The method of claim 7, wherein a response from the mobile device as to whether the mobile device detected the audible mobile device search signal is received by the vehicle via the wireless connection.

9. The method of claim 7, further comprising maintaining the link between the mobile device and the vehicle computing device after the vehicle ignition is turned off.

10. The method of claim 7, wherein linking the vehicle computing device with the mobile device occurs after determining that the vehicle ignition is off and that the vehicle lock has been actuated.

11. The method of claim 1, wherein the audible mobile device search signal is a high frequency signal.

12. The method of claim 1, wherein the first audible indication is played through an indicator speaker positioned outside of the passenger cabin.

13. The method of claim 1, further comprising transmitting a wireless signal to a wireless remote computing device, such that the wireless remote computing device generates the first audible indication when the mobile device is within the passenger cabin of the vehicle.

14. A vehicle having a system for indicating the presence of a mobile device within a passenger cabin of the vehicle, the system comprising a vehicle computing device comprising a memory component that stores logic that, when executed by the vehicle computing device, causes the vehicle computing device to:
   determine whether a vehicle ignition is off;
   determine whether a vehicle lock has been actuated;
   generate an audible mobile device search signal that is played through a cabin speaker when the vehicle ignition is off and the vehicle lock has been actuated;
   receive a response from the mobile device at the vehicle computing device, wherein the response is indicative that the mobile device detected the audible mobile device search signal; and
   generate a first audible indication that the mobile device is within the passenger cabin when the response from the mobile device is received.

15. The vehicle of claim 14, wherein the logic further causes the vehicle computing device to link with the mobile device.

16. The vehicle of claim 14, wherein the logic further causes the vehicle computing device to generate a second audible indication different from the first audible indication when the mobile device is not within the passenger cabin.

17. The vehicle of claim 14, wherein determining whether the vehicle lock has been actuated comprises receiving, by a wireless receiver communicatively coupled to the vehicle computing device, a door lock request signal.

18. A vehicle computing device for indicating the presence of a mobile device within a passenger cabin of a vehicle, the vehicle computing device comprising a memory component that stores logic that, when executed by the vehicle computing device, causes the vehicle computing device to perform at least the following:
   determine whether a vehicle ignition is off;
   determine whether a vehicle lock has been actuated;
   generate an audible mobile device search signal that is played through a cabin speaker when the vehicle ignition is off and the vehicle lock has been actuated;
   receive a response from the mobile device at the vehicle computing device, wherein the response indicative that the mobile device detected the audible mobile device search signal;
   generate a first audible indication, with an indicator speaker, that the mobile device is within the passenger cabin when the response from the mobile device is received; and
   generate a second audible indication, with the indicator speaker, that the mobile device is not within the passenger cabin when the response from the mobile device is not received, wherein the second audible indication is different from the first audible indication.

19. The vehicle computing device of claim 18, wherein the audible mobile device search signal is generated through a vehicle audio system that includes the cabin speaker.

20. The vehicle computing device of claim 18, wherein the vehicle is linked to the mobile device via a wireless connection.

* * * * *